United States Patent
Sanders (10) Patent No.: US 6,174,595 B1
(45) Date of Patent: Jan. 16, 2001

(54) COMPOSITES UNDER SELF-COMPRESSION

(76) Inventor: James F. Sanders, 1439 E. Oaks Trail, Houlton, WI (US) 54082

(*) Notice: Under 35 U.S.C. 154(b), the term of this patent shall be extended for 0 days.

(21) Appl. No.: 09/023,515

(22) Filed: Feb. 13, 1998

Related U.S. Application Data (60) Provisional application No. 60/038,574, filed on Mar. 3, 1997.

(51) Int. Cl.$^7$ .................................................... B32B 21/02
(52) U.S. Cl. ................................. 428/295.4; 428/292.4; 428/293.7; 428/294.7; 428/295.4; 428/299.1
(58) Field of Search ........................... 428/292.4, 293.7, 428/294.7, 295.4, 299.1

(56) References Cited

U.S. PATENT DOCUMENTS

| | | | |
|---|---|---|---|
| 3,637,457 | 1/1972 | Gothard | 161/140 |
| 3,813,098 | * 5/1974 | Ficher et al. | 273/72 |
| 4,063,838 | 12/1977 | Michael | 403/343 |
| 4,077,577 | 3/1978 | Wright | 242/7.22 |
| 4,316,925 | 2/1982 | Delmonte | 428/105 |
| 4,363,667 | 12/1982 | Birchall | 106/90 |
| 4,414,262 | 11/1983 | Hartmann | 428/222 |
| 4,529,567 | 7/1985 | Richard | 264/228 |
| 4,617,219 | 10/1986 | Schupack | 428/113 |
| 4,810,552 | 3/1989 | Meyer | 428/113 |
| 4,979,992 | 12/1990 | Bache | 106/644 |
| 5,114,653 | 5/1992 | Schuerhoff | 264/228 |
| 5,362,545 | 11/1994 | Tingley | 428/96 |
| 5,571,628 | 11/1996 | Hackman | 428/605 |

OTHER PUBLICATIONS

Neville, A.M. Properties of Concrete, Forth Edition, Wily, New York, 1996, pp.251, 328, 435.
Alwan, J. and Naaman, A. Journal of Engineering Mechanics, vol. 120, No.11, Nov., 1994, p. 2455.
Domone, Pard Tanks., ACI Publication SP–91, vol. 2, 1986 pp.1231–1245.
ACI 440–96, State–of–the–Art Report on Fiber Reinforcement for Concrete Structures, Detroit, 1996 Bologura, P. and Shah, S., Fiber Reinforced Cement Composites, McGraw–Hill, N.Y., 1992, Chap. 13.

* cited by examiner

Primary Examiner—Rich Weisberger
(74) Attorney, Agent, or Firm—Skinner and Associates (57) ABSTRACT

Fiber reinforced brittle matrix composites are disclosed with improved mechanical properties. The composites comprise extensible, somewhat elastic fibers and hardened brittle matrix materials. The fibers are positioned to support the composite in a three dimensional manner. Temporary tension forces are applied to some of the fibers before the matrix has completely hardened. The resulting three dimensional array of aligned fibers acts to improve the properties of the composite by providing self-compression. Self-compression is enabled by the alignment and stored elastic energy resulting from the temporary tension and from other deformations acting with the fiber network. The composites have improved response to challenges such as matrix shrinkage during hardening or bending forces and impacts. The invention is particularly useful with brittle, high modulus matrixes, such as cementitious materials and elastic fibers such as polymeric fibers. The composites are useful as structural members and as barriers to protect materials such as steel or fiberglass and articles such as plastic pipes. Selected composites of this invention can exhibit self-healing after having been damaged by destructive deformations.

16 Claims, 1 Drawing Sheet

COMPOSITES UNDER SELF-COMPRESSION

CROSS-REFERENCE TO RELATED APPLICATIONS, IF ANY

This application claims the benefit under 35 U.S.C. §119 (e) of co-pending provisional application Serial No. 60/038,574, filed Mar. 3, 1997 Application Ser. No. 60/038,574 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to composite materials, and methods of making and using composite materials. More particularly, the invention relates to composite materials which are hardened and maintained under self-compression.

2. Background Information.

Common conventional fiber reinforced composites contain fibers such as glass, polymeric and carbon fibers in either continuous or chopped forms. The matrix materials are plastic resins such as the polymerization product of unsaturated polyester with styrene or the reaction product of amines with epoxy resin. The matrix material may also be a thermoplastic. Many other variations are known. Conventional composites are strong, impact resistant and lightweight. These properties are useful in the construction industry. In U.S. Pat. No. 4,316,925 carbon fiber composites are used to reinforce concrete. In some cases the fibers are tensioned to form the composite and align the fibers. For example in U.S. Pat. No. 5,114,653 polymeric fibers are used with an epoxy matrix to provide prestressed reinforcing rods for concrete. In U.S. Pat. No. 4,063,838 tensioned glass fiber composites are used to replace paint as a protective barrier for metal. In U.S. Pat. No. 5,362,545 wood is similarly protected.

Although a large number of conventional composites have been disclosed, the use of conventional composites in construction has been very limited. The reason is related to the costs of these materials relative to common construction materials such coated steel reinforcing rods, wood beams and molded or extruded plastic pipe, drains and the like. Also, conventional composites exhibit some serious deficiencies in their mechanical and chemical properties.

Construction materials usually need to be strong, rigid and inexpensive. Conventional composites usually have good strength but have limited rigidity. The rigidity is reflected in a material's modulus. The modulus of typical conventional composites is about 20 GPa (gigapascals) to 75 GPa, although some expensive exceptions exist. Steel, by comparison, has a modulus of about 210 GPa. Therefore it is often found that in order to obtain rigidity comparable to common materials the conventional composite must be used to an extent that the cost becomes one to two or more orders of magnitude, or more, higher than that of the common materials. An additional contributing factor is that although selected fibers may have a high modulus, the matrix resins have generally low moduli, typically from about 2 GPa to 5 GPa. The combination of fibers plus resin has substantially lower modulus than the fibers alone. Composites with costly very high fiber volume fractions thus need to be used to retain rigidity.

Another mechanical limitation of conventional composites is their failure mode. Steel, when highly stressed, exhibits ductile failure; thus steel continues to be load carrying at high stresses. Conventional composites usually exhibit brittle failure, therefore the load of the failed member is rapidly transferred to the remaining load carrying elements in the structure. This can lead to catastrophic failure.

Conventional composites also have limitations due to their chemical nature. Epoxy resins are photochemically reactive and thus need to be protected from outdoor light exposure. They also can be water sensitive. Polyester and vinyl ester resins, being esters, can be hydrolyzed in high pH environments, such as when embedded in concrete. Conventional composites, when used as coatings or barriers for common materials, also exhibit many of the problems of ordinary paint. Moisture can be trapped at the interface between the conventional composite and the common material and can cause blistering and corrosion. Gasses, such as hydrogen, can also cause bond failure at interfaces with steel.

To overcome the limitations of conventional composites, a large number of cementitious composites have been disclosed. Cementitious composites contain fibers and inorganic cement matrix materials such as Portland cement. More generally, inorganic cements have been classified as hydraulic cements, such as Portland cements, alumina cements, natural cements, pozzolans and slag cements and non-hydraulic cements such as gypsum and magnesium cement and the like. Hydraulic cements are water resistant when hardened. Some additional cements, not strictly belonging to these two groups are lime cement and various other silicate based cements. Cements usually contain water and chemical admixtures and often contain polymers and inert materials such as crystalline silica or other minerals. The corresponding composites belong to a class of composites called brittle matrix composites, because the neat matrix materials will exhibit fracture at very low strains, typically less than 0.1 percent. Other brittle materials include ceramics, glassy materials and some metals.

The cementitious composites, which have greatly improved ductility over the neat matrix, contain fiber volume fractions between 10 and about 30 percent. Volume fractions below about five volume percent may be useful for applications such as crack control, but they do not provide a marked improvement in strength and ductility over the neat matrix. Fiber volume fractions above about 30 volume percent are possible but they are more difficult to achieve due to the problem of mixing fibers with particulate containing matrix materials without excessive void formation; i.e. the problem of consolidation. By reference, the volume fractions of fibers in conventional composites is usually between about 10 and 70 volume percent.

Cementitious composites offer potential solutions to the limitations of conventional composites. The cements can be lower cost, often by an order of magnitude, than the resins of conventional composites. Further, cements usually have a very high moduli, typically from about 10 GPa to over 40 GPa. This offers the possibility of formulating composites with sufficient amounts of expensive materials such as fibers, to provide the required strength and ductility, while using much more of the low cost matrix material to provide the rigidity. That is, the structural element can be made as rigid as required, while retaining low cost, by making the element larger, as long as the fiber volume fraction remains high enough to provide good composite properties.

Cements have better weathering properties than resins since they are usually much less sensitive to light and water. Cementitious composites also can provide good barrier properties to common construction materials. The high pH of some cements can protect metals by passivation while the cementitious composite can provide strength and impact and abrasion resistance that is far superior to paint films. The cementitious composites usually are not complete barriers, thus they allow the slow passage of water and gasses which prevents damage to the interface of the composite and the surface of the material to be protected and/or reinforced, such as metals or treated wood. Cementitious composites can also provide protection and rigidity to certain plastic elements, such as polyolefin pipe and the like at low cost.

However, cementitious composites are severely limited by the low strength of the cements and by their brittle nature. Cements typically have low strength in compression and have extremely low strength in tension relative to matrix resins.

Another limitation is that it is difficult to mix fibers and cement pastes to obtain uniformity. It is much less difficult, for example, to saturate fibers with liquid resin. To reduce the mixing problem and to improve strength, short fiber cementitious mixes have often been made with excess water, then partially dewatered before use by a process of water removal related to filtration. Further improvements have been made by also including continuous fibers in the short fiber composite. In U.S. Pat. No. 4,077,577 short fibers of asbestos are used to reinforce a cementitious matrix for a pipe. The pipe also is reinforced with helically wound continuous aramid fibers. The short fiber cementitious matrix thus becomes the matrix for the continuous fibers. The short fiber matrix is made by dewatering. However, the improvement of U.S. Pat. No. 4,077,577 is costly to implement and requires toxic materials.

In U.S. Pat. No. 4,810,552 a sheet shaped article is disclosed, which contains continuous fibers in a cementitious matrix. The continuous fibers are positioned in the plane of the sheet and coated with short fibers in a cementitious matrix. However the matrix remains weak and the short fibers provide very little ductility.

Another technique that has been used to improve the ductility of cementitious materials is represented by a process called SIFCON, or slurry infiltrated fiber reinforced concrete. Here three dimensional loose arrays of short fibers are infiltrated with cement paste, usually with the help of vibration. By providing a three dimensional array of reinforcing fibers, the effect of the brittle matrix is somewhat reduced. However, slurry infiltration is a slow and difficult process. SIFCON materials were studied in the 1970's and were evaluated for missile silos in the early 1980's. SIFCON has been used with conventional steel rod reinforcement in U.S. Pat. No. 4,979,992 to provide structures with improved ductility. However this process is more difficult than simple SIFCON, due to the interference of the rods during cement infiltration.

Long or continuous fibers have been used in a process called SIMCON, which is slurry infiltrated continuous fiber mat reinforced concrete. The mat systems are disclosed in U.S. Pat. No. 3,637,457, U.S. Pat. No. 4,414,262 and U.S. Pat. No. 4,617,219, where three dimensional polymeric nonwovens are used and in U.S. Pat. No. 5,571,628 where shaped mats of long steel fibers are disclosed. The slurry infiltrated mats generally provide the most improved mechanical properties of the composites in the brittle matrix composite group. The improved tensile and flexural properties result from the use of long or continuous fibers. The definition of continuous fibers depends somewhat on the specific material sets, but they can generally be defined by the aspect ratio of the fibers. The aspect ratio is the ratio of the fiber's average length to the fiber's average diameter. Fibers with aspect ratios over 500 generally act as continuous fibers while fibers with aspect ratios below about 200 exhibit composite properties that are greatly affected by fiber end effects and thus act as short fibers in composites. Brittle matrix composites are unusually sensitive to short fibers because the fiber-matrix bond is often weak and the matrix deforms by cracking, thus further weakening the bond.

However, all of the above brittle matrix composites suffer from reduced fiber efficiency; that is, much of the fiber volume fraction is used to reinforce the matrix, rather than be aligned in the directions of expected stress when the composite is used. For example, in a composite with an elongate shape it is desirable to have the lengthwise fibers uniformly aligned so that they can act together to resist tension or bending forces. This has not been possible with brittle matrix composites because of the nature of the response of the matrixes to deformations. When a conventional resin matrix composite is deformed, the matrix is strained by elastic and plastic mechanisms. When a brittle matrix composite is significantly deformed, the matrix strain is produced by the cracking of the matrix. Matrix materials in composites provide connectivity between the fibers so that the fibers can act together to respond to loads. Brittle matrix composites of aligned fibers are damaged when deformed because the fibers can no longer act together due to matrix cracking. The mat approach improves the brittle matrix composite response because the randomly placed continuous fibers bridge the cracks, but at the expense of fiber efficiency. Conventional composites, by comparison, are very useful when the fibers are aligned, such as when used in a uniaxial composite as an aircraft wing spar cap.

Thus the above disclosed prior art provides some routes to improved properties of brittle matrix composites, but fails to provide properties approaching those of conventional composites and thus are not widely used. An additional reason for this failure is the effect of fiber addition when the brittle matrix is a cementitious matrix. Surprisingly, when fibers are added to cementitious materials they usually add to the pore structure. The increased pore content, which presumably is the result of shrinkage and paste segregation, further degrades the properties of the composite. Thus, the addition of fibers causes a weakening effect, which offsets the desired strengthening effect. This issue is described in Alwan J. and Naaman A., Journal of Engineering Mechanics, Vol. 120, No. 11, November, 1994, pg. 2455.

In order to enhance the properties of cement, an improvement can be made by reducing the defect structure during hardening. In U.S. Pat. No. 4,529,567 concrete articles are made by holding the concrete mix under high pressure (at least 50 MPa) during the hardening process. Substantial improvements in mechanical properties are claimed. However, the process of obtaining and retaining hydraulic pressure during the hardening period is difficult in a production process. This can be particularly difficult when hardening shrinkage is considerable.

In U.S. Pat. No. 4,363,667 another approach to reducing defect structure and improving ductility is described. Cement pastes containing small particles are used. Small particles, such as microsilica, fill the voids between the larger cement particles. Small particles can be further effective if they are pozzolanic. The use of microsilica alone increases brittleness, but to provide ductility, the paste is also reinforced with short fibers and mixed with water dispersible polymers. The polymer aids in dispersion, consolidation and strengthening of the composite. Water reducing admixtures are also used to reduce pore content. This technology was later also the subject of academic research, where mixtures were consolidated on two roll mills and thereafter hardened while being molded in a press. Very ductile products were obtained, but these processes were complex and it was difficult to use continuous fibers. Continuous fibers generally provide much improved properties over short fibers in composites.

The effects of application of pressure during hardening on the mechanical properties of hardened cementitious compositions are related to the reduction of voids or flaws. Voids in cementitious systems can be formed during the hardening process due to shrinkage over long time periods. In Neville, A. M., Properties of Concrete, Forth Edition, Wily, New York, 1996, pg. 435, shrinkage is described as continuing at a rapid rate for three months to one year after casting. When pastes are used which contain high concentrations of cement, such as used in SIMCON, the magnitude of the shrinkage can be very large. Therefore the application of pressure for long time periods would seem to be required in order to improve the mechanical properties of cementitious composites by consolidation. This is usually impractical in an industrial operation.

Thus there is a need to provide an improved composite which fulfills the potential offered by high modulus, brittle matrix materials over conventional resin matrix materials.

BRIEF SUMMARY OF THE INVENTION

It has been discovered that composites, which are comprised of continuous, extensible, somewhat elastic fibers and matrixes that are hardened to high modulus brittle materials, can provide greatly improved properties over the prior art. The fibers in the composites are positioned so that they can provide support in all directions and at least some of the fibers are temporarily tensioned. The tension forces may be applied along only one direction of the composite, but the fibers must be positioned to act in all directions. In the preferred elongate composite of the invention, some of the fibers are aligned by tensioning in a lengthwise direction, while other fibers are positioned in an aligned manner to provide lateral support in a spiral fashion. The temporary tension acts with the three dimensional aligned array of somewhat elastic fibers and the brittle matrix. The matrix materials and fibers are selected together, such that the matrix can, in part, support retraction forces that result from the temporary tension. This provides the elastic energy needed to act upon the composite to compensate for shrinkage and compression and adds to the elastic energy that results from other extensional deformations that are the result of composite swelling and externally applied forces.

It is believed that the unique combination of aligned and positioned fibers and the elastic forces that result from both the initial temporary tension and any subsequent applied deformations become a containment means. The containment means acts to improve the properties of the composite, because it is believed that it restricts the movement of the components of the composite on a microscopic scale. The mechanism for the improved properties is further believed to be related to the fracture mechanics of the matrix materials. Matrix motions, caused by shrinkage, deformations, impacts, swelling and the like, are believed to cause micro-fractures in the brittle matrix material. The micro-fractures elicit a response from the elastic fiber network, which acts to hold the micro-fractured matrix together.

The improved properties of the composites are a result of the interaction of aligned elastic fiber support in both the lengthwise and lateral directions of the composite with additional affects of the temporary tension. The temporary tension is applied to some of the fibers before the matrix has completely hardened. This aligns the fibers and stores elastic energy. The elastic energy adds to the elastic energy that results from additional extensional deformations and provides contraction when the composite is compressed. The improved properties are defined as being a result of self-compression. It is believed that self-compression makes it difficult for micro-fractures in the composite to grow into large defects.

The composites of this invention therefore exhibit the desirable properties of infiltrated continuous mat cement composites, pressure hardened cements and high performance aligned fiber resin matrix composites.

The conversion rate of the elastic energy into self-compression and the continuing relaxation of the internal stresses are expected to vary with the physical state and mechanical history of the composites. These composites are "smart materials" because they use their assets of stored elastic energy and fiber support and alignment to respond to challenges as they occur. When some of the stored elastic energy is employed in self-compression, some of the fibers may retract while others may be extended. For example, the preferred spiral wound composites of this invention tend to form an expanded section or knot in the area where the matrix integrity has been damaged by excessive bending, repeated impacts or chemical means. In this case the lengthwise fibers have retracted to shorten the composite, while the lateral fibers have been extended.

The composites of this invention are found to have substantially greater rigidity, ductility flexural strength and improved impact resistance and toughness over related composites of the prior art. They also can exhibit and a remarkable property that is herein termed self-healing. Self-healing is the ability of selected composites to regain a substantial amount of their rigidity, as a result of self enabled bonding, after having been damaged by impacts or large strains. For example, the damaged composites may self-heal by exposure to water if the matrix is hydraulic. These properties are believed to be a result of the self-compression that acts to vigorously compress the micro-fractured matrix and thus enable bond formation. The possibility of self-healing is therefore believed to be inherent in the mechanisms responsible for the improved mechanical properties of the composites of the invention.

Composites that have high ductility and exhibit the most effective self-healing also have high fiber volume fractions and small fiber diameters. These composites have a finely partitioned matrix. When the matrix of the composites are fractured due to shrinkage, deformations, or impact, it is believed that higher concentrations of smaller cracks are formed. This enhances the mechanical properties and the self-healing process.

Self-healing is believed to be related to autogenous healing, as described in Neville, page 328. Autogenous healing has been thought possible because cement particles are usually not completely hydrated during hardening. When the hardened cement is fractured, fresh unhydrated cement is exposed. If the cracks can be very tightly held together and exposed to water, the unhydrated material can hydrate to bridge and heal the crack. This invention provides a means to take advantage of autogenous healing to an unprecedented degree.

The composites of this invention provide a novel means of adding a prestressed article, such as a strut, to a structure if the composite contains fibers that are held in a highly extended elastic state by the matrix. The extended state may include bends. The composite then can be attached without applying stress to the structure. When the structure is challenged and the composite is deformed, contraction forces are applied to the structure.

The self-compression described here is not the same as uniaxial compression in the prior art. Uniaxial compression, as practiced on a macroscopic scale by prestressed or post tensioned concrete technology, only affects the post crack performance of the cementitious material in a macroscopic manner and does not modify the concrete. The rods may be positioned in several directions and yet do not affect the concrete matrix. In conventional resin matrix composites, fibers are often tensioned to align the fibers and to force the composite to conform to shapes as in U.S. Pat. No. 4,063,838 and U.S. Pat. No. 5,362,545. However, this has no effect on the resin matrix.

In the prior art, pressure molding or vacuum bagging is used to apply compression to composites during hardening. This does provide the compression needed to aid consolidation and removal of excess matrix material. But pressure molding and vacuum bagging are expensive and difficult to implement for the time periods required for many materials, and, most importantly, they do not effect the remaining matrix after the pressure is released.

The benefits of self-compression can also be used as a means of protecting other materials that can be contained within the composite. The protected regimes in the composite may contain common materials of construction such as metal, fiberglass, plastics or wood. The protected regimes are termed compartments because they can be considered as being uniquely isolated from the external environments of the composites. In an elongate composite the compartments are contained within the lateral confines of the composite.

It is an object of the invention to provide improved fiber reinforced composites that comprise brittle matrix materials that have been consolidated, hardened and thereafter continue to be contained within aligned three dimensional arrays of continuous elastically effective fibers. The fibers are sufficiently elastic to provide self-compression to the composite during and after the hardening of the matrix. Self compression is the term used to describe the combined effects of fiber alignment, fiber positioning and temporary tensioning of elastic fibers on the composite.

It is also an object of the invention to provide improved fiber reinforced composites that contain extensible and somewhat elastic fibers, some of which have been tensioned. The tensioned, extensible and somewhat elastic fibers can act upon brittle matrix materials during and after hardening to provide the improved properties of the composite. The matrix materials and fibers are preferably selected such that the matrix materials are sufficiently rigid to support an effective amount of retraction force in some of the fibers when the fiber volume fraction is over about ten volume percent. The composites have improved properties as a consequence of the self-compression that arises from the action of the elastic energy, the fiber placement and alignment and other lateral constraining means on the matrix. The composites exhibit the advantages of infiltrated mat composites, pressure hardened cements and high performance aligned fiber resin matrix composites.

It is also an object of the invention to provide fiber reinforced composites with improved strength, ductility, impact resistance, rigidity and weather resistance by the use of substantially less expensive material sets than conventional resin matrix composites.

It is also an object of the invention to provide composites that may be used as an improved barrier. The composites act to provide a compartment to isolate other materials such as metal, plastic or wood.

It is also an object of the invention to provide composites that can sustain substantial impacts and be damaged by excessive strain that thereafter can in part self-heal by the use of self enabled reactions of the matrix. The bonding can be initiated with water when the matrix is hydraulic.

It is also an object of the invention to provide composites that can be added to structures without the application of stress and yet provide contraction forces when the composites are challenged.

It is also an object of the invention to provide fiber reinforced composites with improved properties that can be fabricated with low toxicity water based matrix components.

DETAILED DESCRIPTION

The composites of the invention are formed by the mixing fibers and the matrix materials to produce saturated tows. A tow is any collection of continuous fibers, some of which may be entangled or twisted. The saturated tows contain at least about 10 volume percent fibers. The composites are fabricated by positioning the saturated tows so that they support both the lengthwise and the lateral directions of the composites. Support in the lateral direction can also be added after the matrix for the lengthwise tow has hardened. At least some of the fibers are initially tensioned, preferably in the lengthwise direction. The tension is applied and sustained in a manner that prevents the fibers from relaxing completely when the tension is released. This is believed to further align the fibers such that they can act together to provide strength and more effectively store elastic energy. The relative amount of elastic energy that remains after the tension is released, is affected by the amount tension applied, the type of fibers and the degree of hardening of the matrix. The degree to which the fibers are aligned and the amount of elastic energy remaining can also be influenced by the rheological properties of the matrix and the support from other fibers, such as the lateral fibers, and attached substrates, compartments and the like.

Figure 1:
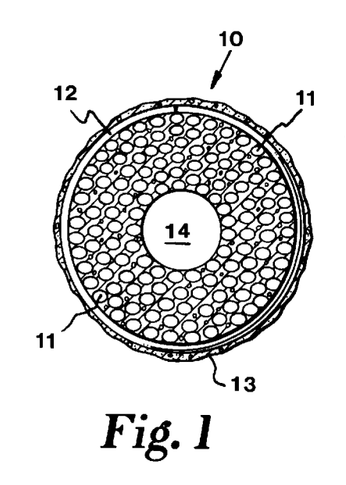
FIG. 1 is an end view of an embodiment of the composite material of the present invention.
Figure 2:
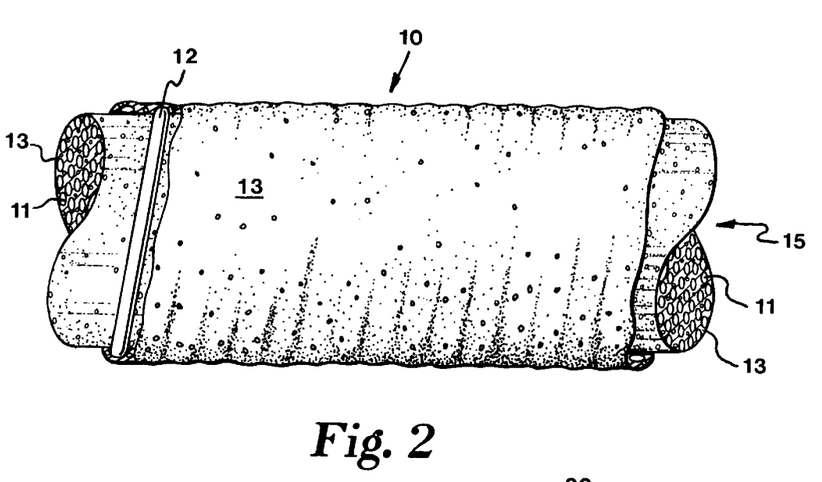
FIG. 2 is a side view of the composite.

Referring to FIGS. 1 and 2, a preferred embodiment of the composite material 10 of the present invention is shown. This embodiment uses polyolefin fibers 11 and cementitious matrixes 13. The saturated fibers 11 are formed into a lengthwise tow 15 of the desired size. The lengthwise tow 15 is spiral wrapped with additional saturated fibers 12 to provide the lateral support. The composite material is shown in conjunction with an optional compartment 14. The composite 10 is preferably further tensioned to add as much elastic energy to the fibers as possible without causing fiber damage, although temporary tension is also effective when it is used at low levels, primarily to align the elastic fibers. Generally, for cementitious matrix-polyolefin fiber composites, the temporary tensile force should be between about one half percent and about forty percent of the breaking strength of the composite in the direction of the applied tension. Tensions below about one half percent of the tensile strength do not effectively align typical entangled polyolefin fibers when used with typical paste consistencies. Tensions above about forty percent can be used, but they risk fracture of the composite. The tensioning preferably aligns and adds elastic energy to both the lengthwise and the spiral fibers. The tension is preferably applied at about twenty five percent of the composite breaking strength. The tension is preferably released when the lengthwise strain recovery is less than about twenty percent of the applied strain and when the matrix is still undergoing some hardening. The preferred strains and strain recoveries can vary widely depending on the material sets and the properties and process for which the composite is being optimized.

The spiral wrap may be added before, during or after the tensioning step. It is preferred that some, but not all, of the tension be applied before the spiral wrapping is done. It is believed that the fibers are more easily aligned by tension when unencumbered by the spiral wrap. Some tension during the spiral wrap is desired so that the spiral tow can also be easily tensioned. Too much lengthwise tension before the spiral wrap makes it difficult to obtain good consolidation since the lengthwise fibers are very rigid when highly tensioned.

The amount of lateral fiber support required to obtain the improved flexural properties has been estimated by use of the preferred embodiment. The fibers that are used for the spiral wrap need to be placed such that no gap exists between the spirals which is larger than about twice the length of the largest lateral dimension. With this maximum spiral gap the tensile strength of the spiral wrapping tow should be at least one percent of the tensile strength of the lengthwise tow. It is preferred that at the spiral wrap be placed without gaps along the length of the composite. It is also preferred that the ratio of the average cross sectional area of the spiral wrap to the average cross sectional area of the complete composite be at least 0.12 when tows of about the same composition are used in both the lengthwise and spiral placements.

The invention is useful with extensible, somewhat elastic fibers and brittle matrix materials. The terms extensible and brittle refer to the magnitude of the strain of the neat fiber or the neat matrix at break, not to their strength. In the preferred embodiment, extensible materials are defined as those that can be strained in the direction of interest to at least about two percent without fracture. Brittle materials are those that can be strained to less that about one percent before they fracture. The ductile brittle matrix composites of this invention, continue to be load carrying with increasing strain even though some of their components, such as the matrix component, may exhibit increasing fracture. In the preferred embodiment of this invention the polyolefin fibers have a strain at break of four to thirty percent while the cementitious matrix materials have a strain at break of typically about 0.10 percent or less when measured neat. The matrix strains at breakage given for at least centimeter size samples in extension under typical ambient conditions. The fracture of a brittle material depends generally on the sample size, the type of stress (extension, compression, shear), the rate of strain, the sample orientation and other factors such a temperature and humidity.

The invention provides a means to use brittle materials with extensible fibers under conditions of large strain, such as caused by shrinkage or externally applied forces. Other selections of fiber and matrix systems, having similar relationships, will occur to those skilled in the art. For example, brittle ceramic matrix materials could be used with extensible elastic metal fibers.

The invention is further disclosed by describing preferred, but non-limiting, composite material sets and preparation methodologies.

A tow of 70,000 denier continuous polypropylene fibers, having an individual fiber diameter of about 20 microns, of the type used to weave industrial strapping, is saturated with a paste containing Portland cement, microsilica and water reducing and retarding admixtures. The saturated fibers are wound on large reels and stored in a cooler as a prepreg. The fiber volume fraction is about 20 percent. When cooled, the prepreg tow reels are mounted on a filament winding and tensioning device.

The device, hereafter termed the large apparatus, has the following features and is capable of the following functions. Electrically powered rotatable and tensionable mandrels are mounted in bearings on the ends of the device. The inner or inboard ends of the mandrels are separated by the desired sample length (3 meters) and contain pins on which the prepreg tow is looped. The prepreg tow is looped between the mandrels to form a sample tow of, for example, 560,000 denier in fiber basis weight (eight loops of 70,000 denier) and three meters long. The sample tow contains the lengthwise fibers of the article of the invention. The sample tow is then tied or clamped on each end, near and on the mandrels, to prevent the sample tow from slipping and to force the fibers together at the ends of the sample tow. The sample tow is tensioned to about one half to 3.5 MPa (75 to 500 psi) based on the cross section of the complete sample tow. Another reel containing 10,000 denier prepreg, which can be made and cooled at the same time as the 70,000 denier prepreg tow, is mounted on the apparatus. The apparatus is capable of filament winding of the 10,000 denier prepreg winding tow onto the sample tow with a tensile force of about 30 percent of the breaking strength of the 10,000 denier tow during helical winding. The helically placed winding tow completely covers the sample tow and preferably the sample tow is wound with two layers of winding tow with differing winding angles relative to the axis of rotation. The winding prepreg contains the lateral fibers of the article of the invention. Filament winding technology of this type is well known in the art, the difference being the somewhat unique tensionable two piece mandrels and the preferred higher tension on the spiral wrap.

The winding tow is also clamped or tied to prevent loosening. Next, the sample is further tensioned typically to about 30 to 40 MPa (about 4000 to 6000 psi) based on the cross section of the complete composite. The tension is applied by a winch line and with an in line hydraulic scale as a monitoring device. The tensile force is applied to the outboard ends of the mandrels by attaching pins and a clevis to one of the mandrels that is in turn connected to a winch line, while the composite is held in a tension rack. The composite is secured in the rack in the tensioned state by pins positioned through the mandrel and into the rack. The matrix paste is then allowed to harden to the point where the matrix can support the desired level of stress in the lengthwise fibers.

The process of first applying tension to the mandrels prior to or during the hardening of the matrix and thereafter providing for the release of tension on the mandrels is conveniently done in tensioning rack with other samples. When the paste is found to have hardened, the tension is removed from the reusable mandrels with the winch line by removing the outboard pins on the mandrels. The initial hardening of the paste at room temperature generally requires one to four days because the hardening rate of the paste has preferably been highly retarded. The samples are cut from the reusable mandrels and are stored, to further complete the hardening, in wet conditions for about 30 days or more. All of the hardening processes may be accelerated by heat and other means. This procedure is similar to that used in concrete block manufacturing where unhardened concrete blocks on held on racks for accelerated hardening.

The large apparatus is particularly useful for making large samples, for example, three meters long, for practical tests. When small samples were needed for mechanical testing and the like, a more simple process was developed which is convenient and more adaptable. A simple apparatus is made by welding two 2.5 cm diameter solid steel rods to a two meter long steel beam. The steel rods point outward and upward at about a 45 degree angle at both ends of the beam. In the center of the beam is attached a hydraulic jack, which has about an eight ton capacity and a piston stroke of at least 25 cm. To the top of the jack piston is attached a cradle. In use, the fibers are looped repeatedly from one end pin to the other to form a tow of the desired size. The tow is supported between the pins by the jack cradle. The jack is used to provide tension when required. The lengthwise tow is tied to restrain and compress the composite near the pin and jack ends. The spiral wrap is accomplished by using a hand held core containing the prepreg. Thus two short (60 cm) samples can be made in one experiment. Another advantage of the simple apparatus is that the matrix paste is used directly in the apparatus after it is made, therefore complex retarding mixtures are not required.

The composites of this invention are useful by themselves and also useful as a means of protection of other materials such as metals, polymeric materials, treated wood and the like from mechanical and chemical challenges. Regimes that are formed within the composite that are afforded protection are called compartments. Examples of compartments include compartments containing steel. They are particularly useful because one of the primary constraints to the use of steel in construction is corrosion. Painted steel is very subject to damage by impact. The composites of this invention can protect the steel by passivation and low permeability while also providing excellent impact resistance. The composite is not a gas barrier, therefore blisters can not form at the steel interface as a result of gas pressure (e.g. hydrogen gas). The metal can also protected by the permeability of the composite to oxygen since this can expand the range of cathodic protection. Further, the material in the compartment can be deformed to extreme degrees with the expectation that the composite of this invention is ductile and can in part self-heal when exposed to water containing systems.

The composites of this invention can also be used for the mechanical and photochemical protection of plastics. Plastic articles such as polyolefin pipe are commonly used to convey waste water or as other conduits. Because polyolefins have low moduli, an excess of the plastic must be used to provide the required rigidity when the pipe is installed. The composites of this invention can provide a mechanical compartment to greatly improve rigidity at low cost, while maintaining ductility and impact resistance. The ductility of the improved pipe means that the pipe can often still be coiled for ease of transport and installation. The improved pipe is further protected from impacts and sunlight when the pipe is used above grade.

The composites of this invention can provide compartments where other chemical reactions can be isolated. Glass fibers normally can not survive for long periods of time in high pH environments such as in Portland cement. However it is known that if the glass fibers are protected with microsilica containing coatings, then their stability is improved. The affect is apparently related to the sacrificial nature of the microsilica. The microsilica reacts with the available base to form silicates in preference to reaction of the glass fibers that have much lower surface area. The protection is not long lasting due to defects and other limitations in the coatings. When the composites of this invention are used to provide a compartment for a composite containing ordinary pultrusion grade E glass fibers, microsilica and Portland cement, an article is provided which surprisingly withstands accelerated aging in hot alkali far better than conventional composites of polyester resin and glass fibers.

The isolation of compartments can be further enhanced by the spiral winding of a tape at the interface between the composite and the compartment or embedded within the composite near the interface. Tapes comprising semipermeable films such as those made from spunbonded polyolefins are particularly useful. The ductility of the composite allows the tape to deform without tearing due to high, localized strains.

The examples provided in this application are meant to be nonlimiting. For example, the exterior of the composite may modified by treatments such as silanes to further reduce permeability, painted or covered with an extruded layer. The composite may be fabricated by other techniques, such as by the use of continuous processes such as those used in the wire and cable industry. In addition to the protection provided by the composites of this invention, other features can be used to provide further protection to the compartments. For example, tapes, other fibers or wires can placed at interface between the composites of this invention and the compartments.

In order to practice the preferred examples of this invention certain details are herein provided which will be helpful to those skilled in the art.

The cement paste used in the preferred examples comprises Portland cement, microsilica, retarding chemical, superplasticizer and water. However, the invention could be practiced with just a cement and water. Microsilica has been used in mix designs for high strength concrete mix since the 1960's. It is used here to minimize segregation or bleeding when the paste is compressed and because it increases the thixotropic properties of the paste. Thixotropy helps retain the paste in the fibers. Certain polymers may also enhance these properties. The superplasticizer is used to reduce the water content as much as possible to improve strength while maintaining the fluidity of the paste necessary to saturate the fibers. The retarder is used to prevent hardening before the composite is fabricated.

When pastes of this nature are formulated it is possible to generate batches of paste that harden too rapidly or batches that do not harden at all. To solve this problem the amounts of additives and the timing and sequence of additive additions need to be carefully controlled for each formulation. See Neville, pg. 251, for the affect of various cement components on retardation. See Domone, P. and Tank, S., Use of Condensed Silica Fume in Portland Cement Grouts, American Concrete Institute Publication SP-91, Vol. 2, 1986, pg. 1231 for a review of the properties superplasticized mixtures of this type. In addition, the examples of this application describe the use of microsilica in very hardening retarded mixtures. Some adjustments may be needed to compensate for differences in starting materials.

Other materials can be added to the cementitious matrix paste. Polymeric materials, such as styrene-butadiene lattices can be used to reduce permeability. Small size particulate fillers may be added, such as fly ash, rock flour or crystalline silica.

The use of cement pastes to saturate continuous fibers requires special consideration relative to the saturation of fibers with resin. In conventional pultrusion, fibers are pulled through a container of resin. A die is then used to meter and shape the resultant tow. When fibers are used with pastes, tension needs to be maintained on the tow to insure that the fibers are of about equal length and that the tow is not an entangled mass. However, this same tension will usually prevent complete saturation of the tow. The problem can be resolved by recognizing that the tow is properly metered and has a much less tendency to entangle after the initial saturation attempt with paste. The tow is collected on a pull roll or accumulator and saturated for at least one additional time. This can be done in the same or a different tank. In the second saturation the tow tension is reduced as much as possible and agitation is preferably provided to open up the tow to complete the saturation. The saturated tow is then wound on reels with minimum tension and placed in a cooler as a prepreg or it can be used immediately in a continuous process.

The bond between a cementitious matrix and many fibers, particularly polyolefin fibers, is often not sufficient to provide good composite properties. This is in contradistinction to some composite systems where special bond strength reducing coatings must be applied to the fibers. Various chemical and other methods have been disclosed in the literature to modify or roughen polymeric fiber surfaces to enhance bonding to cementitious materials. Perhaps the simplest method is to employ the cementitious paste itself as a micro abrasive. Mechanically working the saturated tow by repeatedly pulling it around sharp corners or over surfaces, micro-roughens the fibers and thus greatly enhances the bond strength. The tanks and other equipment should be designed to do the micro abrasion. When using the simple apparatus, the fibers can be micro-roughened by using two rods or rollers that are worked back and forth repeatedly along the tows prior to winding and tensioning.

The fibers useful in the invention typically have diameters similar to those used in conventional resin matrix composites. However, other types of fibers, which are not usually used in conventional composites, are also useful in this invention. Some of these fibers are made from film. The fibers can be made by highly drawing a polymeric film, then fibrillating the film into fibers. Another type of fiber that is made from film results from the slitting of the film to fibers prior to drawing. The fibers from film have the advantage of being very low cost. They also are useful as the lengthwise fibers in composites that form compartments that are intended to provide isolation from liquids, because the film based fibers tend to lay in parallel overlapping layers after they are wrapped with the lateral fibers.

The fibers of this invention are required to be extensible and somewhat elastic. Most polymeric fibers are elastic enough to be useful in the invention. Excessive stress relaxation will make the fiber less effective. In addition, creep in the fibers can be expected as a result of the natural shrinkage and creep of the composite's matrix, particularly when the matrix is fully loaded by releasing the tension on the fibers. The fibers, strain applied to the fibers, and the material properties of the matrix need to be selected such that creep and stress relaxation are not excessive during the life of the composite. For example, some nylon fibers may need to be used as a partial or complete replacement for polyolefin fibers in certain applications. The fibers may need to be crosslinked in order to minimize stress relaxation in certain applications.

Fiberglass may be used in this invention with cementitious matrix materials. However it is usually not the preferred tensioned fiber because of its high modulus relative to the hardened cementitious paste and its low extensibility. Fiberglass also has some chemical deficiencies. Fiberglass can more advantageously be used in compartments.

Other fibers that may be used in the composite, in a tensioned or untensioned state, include other polymeric fibers, alkali resistant fiberglass, rock wool, synthetic inorganic fibers, carbon fibers and metal fibers. Other fiber and matrix material sets may be selected without departing from the spirit of the invention.

The degree to which the fibers are preferably tensioned depends on the tensile strength and elongation capabilities of the fibers. Higher stresses are generally preferred if the fibers are not weakened or the tow is in danger of fracture. Usually it is safe to stress the fibers to 20 to 40 percent of their breaking strength.

The strain recovery, after release of the external tensioning constraints, should preferably be sufficiently low to provide for some stress to remain in the fibers after hardening of the matrix. In practice the strain recovery can be quite large. In an extreme case the fibers are tensioned and then, with the lateral winding fibers secured, the tension is immediately released. Most of the elastic energy is released into the composite, but the lengthwise fibers do not generally completely relax and remain aligned in the lengthwise direction. It is believed that the stresses in the lateral fibers and the nature of the paste prevent complete relaxation. The paste is both thixotropic and particulate. The particles are trapped in the fibers much as particles are trapped in a filter. This hinders movement of the fibers. Also the distribution of fiber lengths and paths is affected by tensioning because the shorter fibers or the fibers which have a more tortuous path are tensioned, extended and undergo unrecovered strain to a greater degree. Thus it is believed that the tensioning provides a means to align the fibers and establish improved uniformity in the fiber tow and that the effect remains after the tension is released. This results in improved tensile and flexural properties.

There are reasons, however, why composites that contain lesser amounts of stored elastic energy are not the preferred examples. They exhibit inferior hardened flexural properties, probably because the composite can not react as effectively to matrix shrinkage. Secondly, it is difficult to keep the composite straight after the tension is released if the tension is released before substantial hardening of the matrix has occurred. That is, composite matrix materials seldom have completely uniform fiber distributions or harden and shrink with precise uniformity or reaction rates. This can cause warping of the composite. However, these severely relaxed materials may be useful, particularly when the composite is used as a protective layer.

Figure 3:
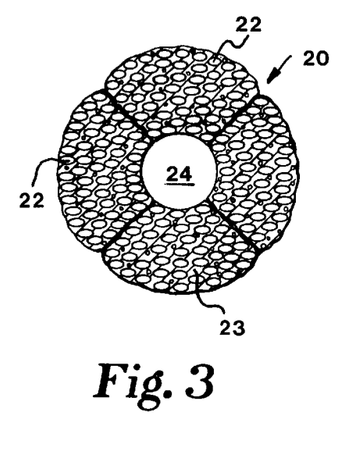
FIG. 3 is an end view of an alternative embodiment of the composite.
Figure 4:
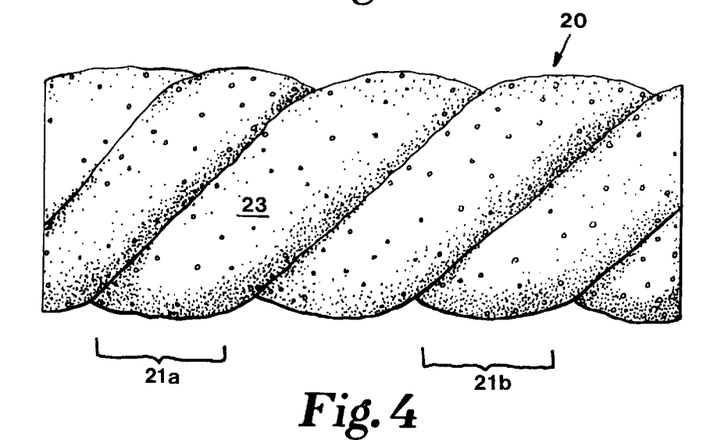
FIG. 4 is a side view of the composite.

There are other methods that can be used to position the lateral support and apply the temporary tension. Referring to FIGS. 3 and 4, a composite material 20 is shown with fibers 22 in matrix 23 with compartment 24. The composite material 20 is representative of an array of aligned fibers, including 21a and 21b, which is the result of the twisting or braiding and tensioning of one or more tows that have been impregnated with a brittle matrix material in its fluid state. The topology of the array can be quite complex due to the twisting and tensioning of the mobile extensible fibers. The fibers tend to form close packed relationships with each other that are influenced by the overall state of the composite. Lateral support is then supplied by the fiber positioning component of the twisting and tensioning action that is perpendicular to the lengthwise direction of the composite, rather than by the winding fibers. This is a different process than in the spiral winding case, as can be inferred by observations made when the e saturated tows are consolidated. In the case of the lengthwise fibers that are lightly tensioned and then spiral wrapped, it is possible to see air bubbles come to the surface and to see occasional fine jets of excess paste being squirted out of the tow in advance of the spiral wrapping. In the case of the tow or tows that are only twisted or braided, the air bubbles are seen when the composite is tensioned. Thus, in the latter case the lateral support, which aids consolidation, is applied at the same time as the fibers are aligned and the elastic energy is stored.

Although the twisted composite can be a more simple construction than the spiral wound composite, it suffers from deficiencies and is thus not the preferred example. The twisted composite must be more completely hardened before release of the lengthwise tension, otherwise the twist will unwind. Secondly, the construction is not as impact resistant as in the winding case, again because the composite tends to unwind after repeated blows. In practice some twisting of the tow can occur during the spiral winding. Thus twisting of the lengthwise tow can be used in both approaches. In general, the lengthwise tow can be twisted utilizing one or more tows.

Another construction that provides the positioning and alignment needed for self-compression is made in a multi step process. The composite is temporarily tensioned and matrix is allowed to harden with a minimum of lateral support. The lateral support may not be sufficient to provide the improved flexural properties, but additional lateral reinforcement can be added latter. The additional lateral support may be provided by adding another composite material or by embedding the composite. This construction is not a preferred embodiment, because some of the benefits of self-compression may not be available during a period of matrix shrinkage, but it could be a less expensive methodology in some applications.

Other forces may be applied to the composite during hardening. Compression molding may be used during part of the hardening stage to further improve consolidation, to shape the composite into, for example, a square or hexagonal cross section or to impress a desired surface finish. The composite may also be bent or formed into various shapes, before, during or after hardening of the matrix.

The following descriptions of composites are offered for the purposes of exemplification and are not intended to be limiting.

EXAMPLE I

The Preferred Embodiment

A fabrication of a preferred construction of the invention involved the following steps and is summarized as follows.

The saturation of the fibers with a cementitious matrix paste was done to provide prepreg tows containing both the lateral and lengthwise fibers. The tows were stored on separate reels. The lengthwise tow was looped, to form the desired finished diameter, between the rotatable and tensionable mandrels on the large apparatus. The distance between the inner mandrel ends was about three meters. The tow was formed by hand to inspect uniformity and to provide some initial shaping and compaction.

The tow was restrained, by tying the fiber tow and by wrapping and tying with additional twine, to prevent the tow from slipping on the mandrels during tensioning and to hold the tow in a tightly compacted form adjacent to the mandrels. The spiral wrapping of the lengthwise tow with the lateral tow was done with tension applied to the lateral tow and sufficient tension also applied to the lengthwise tow to support the tension of the lateral tow during winding. The lateral tow was also fixed in place by tying. The composite was then tensioned in a tension rack to about five percent strain. The matrix was allowed to harden to a level such that the matrix could support the tension in the fibers with a strain recovery of about one half percent. Additional details are as follows.

The cementitious paste was made by mixing 7.5 Kgs (Kilograms) of water with 11.25 Kgs of a 50 weight percent dispersion of microsilica in water. The microsilica dispersion was previously made by mixing Eucon MSA Microsilica from the Euclid Chemical Company, Cleveland, Ohio, with water, using a high speed dispersing type mixer. A charge of 37.5 Kgs of Type 1 Portland cement was then added and mixed for 25 minutes. A mixture of 313 gms. (grams) of Eucon 537 retarding superplasticizer in 625 gms. of water was then added and the mixing continued for another 20 minutes. A mixture of 163 gms of Eucon 100 retarder in 375 gms of water was added and mixed for another 20 minutes. A mixture of 188 gms of Eucon 537 superplasticizer in 375 gms of water was added and the mixing continued for another hour. The chemicals were also available from the Euclid Company.

Part of the paste was added to a saturation box wherein the fibers were mixed with the paste. The box was about 14 cm (centimeters) wide, 30 cm deep and 46 cm long. The box contained guide rods that allowed the fibers to be pulled along the bottom of the box to saturate and provide micro-abrasion to the fibers. The fibers were pulled from the box with a pull roll and thereafter submerged in a second container of paste where they were agitated to complete the saturation. The fibers were then wound on to reels and stored in a cooler until needed.

The fibers were 10 denier polypropylene, which were obtained from the Winzen Company, Sulphur Springs, Texas. They were supplied as a yarn, in roll form, and specified as high tenacity 1000 denier air entangled yarn. The yarn therefore contained 100 fibers.

The yarns from 70 rolls were pulled through the saturation system and collected on reels to form a lengthwise prepreg tow having a fiber basis weight of 70,000 denier (70 times 1000). The fiber volume fraction was about 19 volume percent. A smaller but otherwise identical lateral prepreg tow was also made, by pulling the yarns from 10 rolls (10,000 denier) through the saturation system and storing the tow on another reel.

Eight lengths of the lengthwise prepreg tow were looped on the pins of the rotatable, tensionable mandrels of the large apparatus and formed in to one large round tow. This resulted in a fiber basis weight of 560,000 denier (8 times 70,000). The tow was tied with fibers and twine to compress the tow ends nearest the mandrels to prevent slipping on the mandrel pins and to compact the tow near the mandrel ends. The tow was tensioned to about 1,300 N (Newtons), which is about 300 lbs. of force. This tension was necessary to prevent excessive deflection when the lateral tow was wound. The lateral tow was wound on the lengthwise tow at an angle of about 85 degrees relative to the mandrel axes and in sufficient quantity to cover the lengthwise tow to a uniform depth of about 1.5 mm (millimeter). The windings were always overlapping. A second lateral spiral winding was then made over the top of the first spiral winding at an angle of about 75 degrees and in the opposite direction. In the second case a winding spacing of about one cm was created. The rotation rate of the mandrels was about 60 revolutions per minute.

The lateral fibers were restrained on the mandrels to prevent loss of tension by again tying the tow and further tying with twine to prevent slipping. The composite was tensioned in a rack to about 13,000 N (3000 lbs.). This produced a strain of about five percent. Plastic film was used to cover the composite to prevent water loss. The matrix was allowed to harden sufficiently to allow a strain recovery of about one half percent when the tension on the mandrels was released. This required about three days at about 20 degrees centigrade. The composite was finally allowed to further harden in wet conditions for 30 days before testing.

The testing of the composite was done by flexure measurements. Flexure or load-deflection data provide information about the ductility of the composites. When a composite is bent in a load deflection test, the part of the composite on the convex side will be tensioned while the concave side of the composite will be compressed. When the matrix of prior art brittle matrix composites are fractured in the tension or the compression zones the load carrying ability of the composites in flexure are greatly diminished.

Many tensile test equipment manufacturers make available flexure testing accessories. In general, the results of the tests using the flexure testing equipment are usually presented as load-deflection data (force as a function of the lateral deflection) for a specified sample size, span between supports and other test conditions. Some of the composites of this invention were measured with an MTS Model 810 Test System, available from MTS Co., Minneapolis, Minn. using the flexure testing accessories. The load-deflection data was taken with a 30.5 cm (12 in) span in three point loading.

A special flexure test machine, described here, was also used to obtain data. The special test machine had outer sample supports that were rods, which were covered with lubricated sleeve bearings. The bearings allowed the samples, which were often course textured, to roll easily when the center support was moved to flex the sample. The special test machine was comprised of a rectangular frame and a center load column that consisted of a hydraulic cylinder, which was suspended by a Model LCCA-2K load cell and Model DP41-S strain gauge indicator, both available from the Omega Co., Stamford, CT. The deflections were measured, using three point loading, with the spans between the bearings maintained at 30.5 cm (12 inches). The outer supports of the sample holder had a sleeve bearing outer radius of about 1.25 cm. The center support was hook shaped and had a radius of about 0.3 cm. The test machine was capable of subjecting the composites to large deflections without the risk that a sample could slide from one of the supports and recoil dangerously.

The load-deflection data for the sample rod of this Example is presented in Table I. The surprisingly large increase in load carrying ability with increasing deflection, which is known as strain hardening, demonstrates the unique properties of the articles of this invention. For comparative purposes a representative fiberglass rod was selected from one of the rods described in ACI 440R-96, State-of-the-Art Report on Fiber Reinforced Plastic Reinforcement for Concrete Structures, American Concrete Institute, Detroit, Mich., 1996. The fiberglass rods in this report have a thermosetting polyester matrix and contain about 50 to 55 volume percent of glass fibers. The representative rod that was selected had a fiber volume fraction of 50 percent and a diameter of one half inch (1.27 cm), which is commonly called a number 4 size. The rod of this invention had a diameter of 2.08 cm and a fiber volume fraction of 19 percent. The volume of fibers per unit length was about the same for both samples: The fiber volume per cm for the fiberglass rod was about 0.64 cubic cm per cm for the glass rod and 0.68 cubic cm per cm for the cementitious rod.

The load-deflection data in Table I show the surprising ductility of the composite of this invention. The cementitious rod continued to be load carrying at deflections beyond those where the fiberglass rod had fractured. The initial rate of increase of load with deflection is a measure of the rigidity of the samples. The rigidity of the cementitious rod is seen to be somewhat greater than that of the fiberglass rod. Since the modulus of the glass fibers is about ten times greater than that of the polypropylene fibers, it is clear that the rigidity of the cementitious rod is due to the matrix contribution to the rigidity and the larger diameter of the cementitious rod.

Some of the economic advantages of the invention can be understood by comparing the relative component costs. The cost per pound of fiberglass and polypropylene fibers is typically about the same. The fiberglass rod has a weight percent of fibers of 70 percent while the cementitious rod has a weight percent of fibers of less than ten percent (the density of glass is about 2.6 and the density of polypropylene is 0.91). The weight per unit length of the glass fibers in the conventional composite of this Example was about 1.85 grams per cm while the fiber weight per unit length of the cementitious composite was about 0.65 grams per cm. Further, the primary components of the cementitious rod are low cost materials, Portland cement and water.

TABLE I

| | Load (Newtons) | |
|---|---|---|
| Deflection (cm) | Cementitious Rod | Fiberglass-Polyester Rod |
| 0 | 0 | 0 |
| 0.5 | 800 | 500 |
| 1.0 | 1030 | 900 |
| 1.5 | 1220 | 975 |
| 2.0 | 1300 | 1225 |
| 2.5 | 1390 | 1280 |
| 3.0 | 1460 | 1370 |
| 4.6 | 1490 | 1345 |
| 5.6 | 1440 | 1025 |
| 6.6 | 1480 | 375 |
| 7.6 | 1560 | 0 |
| 10.2 | 1250 | 0 |
| 12.7 | 1290 | 0 |

To test the self-healing properties, the cementitious sample was then overstrained by forcing the composite to make a 180 degree bend around a five cm radius. The damaged area was strong but very flexible and had grown in diameter to about 1.3 times its original size. The damaged area of the composite was held under a water faucet for about two minutes. The composite was then held in an approximately straight condition while the damaged area was wrapped with vinyl electrical tape to prevent water loss and set aside. After about four hours the composite was no longer easily flexed and after about three days it had regained a substantial portion of its original flexural strength. The self-healing of the extreme damage in the sample demonstrates the unique properties of the articles of the invention for many barrier applications.

EXAMPLE II:

THE EFFECTS OF THE LATERAL SUPPORT.

In this comparative example, four composites were made. The first two composites did not have significant lateral supporting fibers. They differed only in that one of the composites had tensioning applied to the lengthwise fibers as in Example I while the other did not experience tensioning of any kind. Composites of either of these first two types are not articles of this invention.

These composites were also compared with two articles of this invention that do contain the necessary tensioned fibers and also have both lateral and lengthwise supporting continuous fibers. These last two composites were articles of this invention and differed only by the amount of tension applied to the lateral fibers during winding.

In all four samples the same matrix paste was used. It was prepared as in Example I. The lengthwise prepreg tow of 70,000 denier in fiber basis weight was also prepared as in Example I. In addition, a lateral prepreg tow of 20,000 denier in fiber basis weight was prepared in like manner.

In the first composite, 2-A, seven loops of lengthwise tow were wound on the mandrel pins. The tow was consolidated into a round shape and worked to remove entrapped air. The mandrel and tow ends were tied with twine to compress the tow ends near the mandrels as in Example I. A spiral wrap of 4000 denier fiber with a 9 cm spacing was used to ensure that voids did not form during handling. This was, however, not enough fiber to provide significant lateral support. The composite was placed in the tensioning rack to harden as in Example 1, but it was not tensioned.

A second composite, 2-B, was made as in Example 2-A. However, after it was placed in the rack it was tensioned to about 11,000 N, (2,500 lbs.) of force, which was about five percent strain, and thereafter treated as in Example I.

A third composite, 2-C, was made as in Sample 2-A. This included the use of the 4000 denier winding. However, it was then spiral wrapped with the lateral prepreg tow of this Example using the procedure for the first spiral wrap of Example I. The tension on the lateral tow during winding was about 180 N, (40 lbs.) of force. The composite was then tensioned and further treated as in 2-B.

A forth composite, 2-D, was made in a manner identical to 2-C with the exception that the tension on the lateral tow during winding was at the minimum necessary to obtain a compact covering of the lengthwise tow. The tension was about 45 N, (10 lbs.) of force.

After the 30 day hardening period, the composites were tested in the special three point flexure testing device of Example 1. The distance between the outer supports was 30.5 cm. The data are presented in Table II.

It was not possible, in general, to make the samples with precisely the same diameter, therefore a small correction was made to the data. The data are depicted as the load divided by the cross sectional area of the corresponding composite sample. This approximate correction was usually less than ten percent and did not change the conclusions. The units of the load data are therefore Newtons per square centimeter of the particular sample's cross sectional area.

The data are depicted at load deflections of 2.5 cm where a change in slope indicated a yield phenomenon in all the composites of this example. Samples of the invention, 2-C and 2-D, had much higher load carrying ability than the prior art samples, 2-A and 2-B.

Data is also presented at 5.0 cm deflection, which is well beyond the yield region. At 5.0 cm deflection the much lower numbers for the prior art composites indicate sample failure. The higher numbers for the composites of the invention indicate the desirable strain hardening result.

Data are also presented from a second test wherein the same sample is again deformed to 2.5 cm and 5.0 cm. The deformation data for this second cycle, indicate that the samples of the invention, 2-C and 2-D, maintained about the same load carrying ability, while the uniaxial composites, 2-A and 2-B, had suffered substantial damage in the first deformation.

When the data for 2-A is compared to 2-B, it can be concluded that the prestressing of composites that comprise only lengthwise extensible, somewhat elastic fibers and a cementitious matrix has substantially no effect on the mechanical properties. This result is surprising to those skilled in the art of pre-stressed or post-tensioned concrete.

The data also indicate that the degree of tensioning of the lateral fibers in these samples had no measurable affect on the composite performance as long good compaction and uniform coverage of the lengthwise tow was achieved. Paste consolidation was important, but once it was achieved, substantial improvements in the flexural properties did not result from the application of more force. The presence of the lateral fibers, however, provided improved performance.

The surprising result is that composites that comprise extensible, somewhat elastic fibers and brittle matrixes can exhibit remarkably improved properties only when lengthwise aligned fiber reinforcement can interact with a lateral aligned component of the reinforcement. If no lateral component exists, then the load carrying properties are greatly diminished and are comparable to prior art cementitious composites.

TABLE II

| Composite Number | Load at 2.5 cm | Load at 5.0 cm | Load at 2.5 cm (2nd cycle) | Load at 5.0 cm (2nd cycle) |
| --- | --- | --- | --- | --- |
| 2-A | 225 | 170 | 60 | 130 |
| 2-B | 245 | 178 | 62 | 124 |
| 2-C | 350 | 375 | 330 | 360 |
| 2-D | 355 | 370 | 350 | 360 |

All Loads are Expressed in Newtons per Square cm.

EXAMPLE III

Effects of the Lengthwise Tension.

The affect of the application of lengthwise tension to the fibers, and the release of that tension to provide bulk compression during and after the hardening process, was evaluated in this comparative example. The samples were made using the simple sample fabrication device described above. With this device samples could be made with minimal tension in either the lengthwise or lateral directions if desired. The tensioned samples in this example were compared with samples that were not temporarily tensioned or with samples where the tension was removed early in the matrix hardening process. All of the composites were allowed to harden for at least 30 days in wet conditions after they were removed from the fabrication device before they were tested.

Samples 3-A and 3-B.

A 60 weight percent of microsilica, available as Force 10,000 Microsilica from W.R. Grace Co., Cambridge, Mass., was made in water as in Example I. To 525 gms of the microsilica dispersion was added 18.75 gms of W.R. Grace Daracem 100 Superplasticizer in 200 gms of water. To this was added 1250 gms of Type 1A Portland cement with mixing for five minutes. Finally another 18.75 gms of Daracem 100 in 18.75 gms of water was added and mixing was continued for another five minutes. The paste was used to saturate a 500,000 denier tow using the fibers of Example I. A saturated tow of 16,000 denier in fiber basis weight was used for the spiral wrap. The fiber volume fraction was about 25 percent. Sample 3-A was hardened under tension as in Example 1, while Sample 3-B was hardened without tension.

Using the test conditions of Example I, the load per square cm of cross sectional area, at 5 cm deflection, was 440 N for the tensioned 3-A sample and 210 N for the untensioned 3-B sample. Temporary tension provides improved properties of the spiral wrapped brittle matrix composite.

Samples 3-C and 3-D.

The samples were prepared as in 3-A and 3-B. However, instead of using a spiral wrap to provide the lateral support, the samples were maintained in a divided condition to provide two tows and thereafter twisted with a repeat frequency of about 4.6 turns per meter. The samples were hardened as in 3-A and 3-B. Sample 3-C was tensioned and sample 3-D was not tensioned. The load per square cm of sample cross section, at 5 cm deflection, was 305 N for the tensioned 3-C sample and 170 N for the untensioned 3-D sample.

The results of this test indicate that the value of temporary tension is not limited to spiral wrapped composites.

Samples 3-E and 3-F.

The fiber used for these samples was Bale-Lok 9000, a polypropylene twine sold by the Exxon Co., Kingman, Kans. The twine was a fibrillated film, which was supplied in twisted form in rolls. The twine was untwisted so that the paste could uniformly saturate the fibers and thereafter looped about the pins of the device to form a tow of about 480,000 denier. A second tow of about 26,800 denier in fiber basis weight (one strand of twine), was formed by untwisting, saturating and winding the twine on the lateral winding core. The samples were formed and spiral wrapped and thereafter treated as in samples 3-A and 3-B. They contained about 25 volume percent fibers. Sample 3-E was tensioned and sample 3-F was not tensioned. The samples were measured on a load deflection apparatus attached to the MTS Model 810 Test System. The span of the outer supports was 30.5 cm (12 in).

These samples were found to be much less ductile than the previous samples, probably because the fibers had a much lower surface area. However, the same surprising improvement in load-deflection performance was obtained when the composite was tensioned. Sample 3-E had a yield at about 0.32 cm and a load at the yield point of 263 N per square cm of cross section. The peak load was 356 N per cm squared, at 1.6 cm deflection. Sample 3-F, which was not tensioned had a yield at about 0.24 cm and a load at the yield point of about 70 N per square cm of cross section. The peak load was about 184 N per square cm of cross section, at a deflection of 1.6 cm. Thus the value of temporary tension is not limited to fiber type.

Samples 3-G and 3H.

These samples were prepared as in 3-A. The difference here was that 3-G was hardened under tension for 16 hours at 55 degrees centigrade while sample 3-H was hardened for the same time period at 15 degrees centigrade before the tension was removed. The matrix of 3-G was very rigid and allowed a strain recovery of only about 10 percent while the matrix of 3-H was much less rigid and allowed a strain recovery of over 70 percent. When tested as in Example I, sample 3-G had a load per square cm of cross section, at 5 cm deflection, of about 450 N while the corresponding load for 3-H was about 400 N. This result, combined with the result of the 3-A and 3-B test, suggests that the enhanced response due to the temporary tension is related to both fiber alignment and stored elastic energy.

In summary, the surprising results obtained in Examples II and III show clearly the improved mechanical properties of the composites of this invention. The improved properties were the result of the application and release of tension to at least some of the properly positioned, extensible, somewhat elastic fibers in these brittle matrix composites.

The twisted samples, 3-C and 3-D, also demonstrate the importance of the lateral support. When the samples of Example II and III were tensioned, substantial improvements in flexural properties were obtained only when the lateral support was also present. It is believed that the roll of the temporary lengthwise tension was, in part, to align the lengthwise fibers along the lengthwise axis of the composite so that the fibers could more effectively cooperate to elastically reinforce the composite, particularly in the tension zone, during bending. Further, the elastic energy that was stored as a result of the temporary tension was available to provide an elastic compressive response to deformations such as shrinkage and bending, as long as the elastic energy could act with the lateral support. It is believed that the effects of the temporary tension interacted with the lateral fiber support to create a compressive micro-environment for the matrix when the composite was challenged. This phenomenon is termed self-compression. In the prior art, brittle matrix composites such as SIMCON do not have the advantageously positioned fibers or the tension aligned fibers or the stored elastic energy. In these examples most of the energy was stored in lengthwise fibers, however, it is reasonable to believe that in other constructions, the lateral fibers could play more of a roll in supplying the mechanical stored energy if they were much more numerous.

EXAMPLE IV

The Utility of the Invention

In this Example the utility of the properties of the composites of this invention are evaluated in configurations where compartments are isolated within the composites. The compartments provide enhanced protection for common materials of construction such as fiberglass, metal or plastic.

Fiberglass was used in a compartment provided by a composite of this invention. Pultrusion grade E-glass, Hybon 2001 available from PPG Industries, Pittsburgh, Pa., was saturated with a paste. The paste was made as in Example III. The fiberglass was looped on the pins of the device used in Example III to form a tow of about 36,000 Tex in fiber basis weight. The fiberglass was saturated with paste, then surrounded by a lengthwise, saturated tow of the polypropylene fiber of Example I. The polypropylene tow had a fiber basis weight of 290,000 denier. The lengthwise fibers were then spiral wrapped with a saturated polypropylene tow of 16,000 denier in fiber basis weight to a thickness of about 1.5 mm. The composite was then strained to about 2.5 percent and hardened as in the previous examples. The composite contained about 26 volume percent fibers and consisted of a core of lengthwise fiberglass, a surrounding section of lengthwise polypropylene fibers and an outer layer of spiral wrapped lateral polypropylene fibers.

A second sample was made by using the same fiberglass and paste as the previous sample. However, in this case, the fiberglass was used as the only lengthwise fibers in the composite. The fiberglass tow had a fiber basis weight of about 73,000 Tex. The fiberglass was saturated with paste and wrapped with saturated 16,000 denier polypropylene tow to a thickness of about two mm. The composite was strained to about 2.5 percent and hardened as in the previous case. In this case the lengthwise tow was both the composite and the compartment.

The two fiberglass containing samples were tested to evaluate their chemical stability. It is well known that materials containing amorphous silica or ionic silicon compounds, such as fiberglass, is attacked by strong bases, such as those found in Portland cement. See Balaguru, P. and Shah, S., Fiber Reinforced Cement Composites, McGraw-Hill, N.Y., 1992, Chapter 13, for background. Composites are usually tested under accelerated conditions. For example, in U.S. Pat. No. 5,114,653 the composites are tested at 80 degrees Centigrade in a saturated lime solution. In this example the composites were tested in a 65 degrees Centigrade solution containing 20 weight percent of sodium hydroxide for thirty days. For comparison three composites were selected that comprised E-glass fibers and polyester resin matrixes. They were made by the pultrusion process and were selected as representative from the products described in ACI 440R-96, State-of-the-Art Report on Fiber Reinforced Plastic Reinforcement for Concrete Structures, American Concrete Institute, Detroit, Mich., 1996. All of the samples were protected on the submersed ends by polyethylene caps that were bonded to the composites with a two-part epoxy adhesive. The caps prevented the ends of the samples from reacting with the base solution, thus allowing attack only from the lateral directions. The samples were submersed to about two thirds of their length.

Surprisingly, it was found that the two E-glass containing composites of this invention survived with over 70 percent of their flexural load carrying ability remaining, while the resin matrix composites were completely destroyed and had no remaining strength. Not wishing to be bound by any theory, it is believed that the strong base can react with the cement and microsilica matrix to form more voluminous products. These products can act to expand the matrix. However, the tensioned fibers provided a crack resistant containment means that acted to lower permeability, thus protecting the glass. The ductile composite therefore provided chemical protection.

Steel rods can also be embedded in the composites of this invention. The steel is generally not tensioned. When the paste is in the fluid condition, the composite can be tensioned lengthwise over the top of the steel.

The steel rod used in this sample was a number three plain steel concrete reinforcing rod. The rod was cleaned to remove all rust with a wire brush and thereafter protected with the composite of this invention.

The paste was made by adding 18 gms of superplasticizer to 200 gms of water and then adding 525 gms of 60 percent microsilica with continued mixing. All of these materials were described in Example III. To this was added 1200 gms of Type IA Portland cement with mixing. The mixing was continued for another three minutes and thereafter the paste was allowed to rest for 25 minutes. Finally another 20 gms of superplasticizer in 20 gms of water was added and the paste was mixed for another five minutes. The paste was used to saturate a 290,000 denier fiber tow, using the fiber of Example I. The saturated tow was formed about the steel rod so as to position the rod in the center of the sample. The sample was then spiral wrapped with a saturated tow of the same fibers. The spiral wrap tow had a fiber basis weight of about 16,000 denier. The wrap thickness was about 1.5 mm, the total composite thickness on the steel was about 0.6 cm and the fiber volume fraction in the composite, excluding the steel, was about 25 percent.

To test the efficacy of the composite of this invention to protect steel, a corrosion test was performed. The control was the commonly used prior art fusion bonded epoxy (FBE) coated steel rerod (see ASTM D 3963). Prior to the test both samples were damaged by multiple impacts from a pendulum. The pendulum was a 1.25 cm by 6.25 cm steel bar which was about 90 cm long. The bar was allowed to swing through about a 70 degree angle from the vertical, around a shoulder bolt on its upper end, to impact the samples from the lateral directions. The impacts caused visible damage areas on the FBE rod of about two mm diameter. The composite protected rod was found to be scuffed, with some visible damage to the outer fibers.

Both steel containing rods were protected, on one of their ends, with the epoxy bonded caps, as in the case with the fiberglass samples. The rods were then submerged to about two thirds of their length in a five weight percent solution of sodium chloride, in a steel container. Air was bubbled through the liquid, which was maintained at about 20 degrees Centigrade. The test was continued for a period of six months. At the end of the test period, the steel that was exposed by the impacts to the FBE coating, was found to be severely corroded. The sample with the composite cover was examined by cutting and peeling the composite from the steel. No corrosion was found.

It can be concluded that the composites of this invention can protect compartments from both mechanical and chemical challenges.

Pipes can be protected using the composites of this invention. A polyisobutylene water pipe having an inner diameter of about 0.95 cm and an outer diameter of about 1.25 cm was protected in a manner similar to the steel sample in this Example. The plastic pipe was surface abraded with sandpaper prior to covering with the composite. The abrasion improved the bond between the pipe and the composite. The protected pipe was found to be damage resistant and yet ductile enough to be bent.

Preferred examples of the utility of the composites of this invention included the use of tapes along with the composite, which provided improved protection to compartments. In the wire and cable industry devices are used to spiral wind fibers and tapes. These devices are called binders and tapers. The composites of this invention could also be made with imbedded spiral wound tapes to provide improved protection. This is possible because the composites were very ductile and thereby protected the film from tearing as a result of large localized strains. A preferred tape material was selected from films made from fibers, such as TYVEK™ film available from the DuPont Co., Wilmington, Del. Tyvek™ film is a spunbonded, high density polyethylene film. The microporous nature of films of these types provided improved consolidation and bond strength to the cementitious matrix. Bond strength could be further improved by abrading both sides of the film.

The devices, fibers, paste and procedures of Example I were used to make the following sample. A prepreg of tape was made in the same manner as the fiber prepregs. The tape, which had been slit to 5 cm in width and abraded on both sides by pulling over abrasive rolls, was pulled through the saturation system and collected on a reel. Brush cleaned number 4 steel rerod, three m. (10 ft) long, was suspended between the rotatable mandrels on the large apparatus. The steel was suspended by inserting the steel loosely into the mandrel ends, therefore, when the sample was later strained lengthwise, the steel could slip and thus would not support the applied tension.

The steel was first covered with a fiber prepreg layer in the lengthwise direction, having a fiber basis weight of 120,000 denier. The tape prepreg was then wound on the lengthwise fiber layer with about a 50 percent overlap of the tape spirals. Another lengthwise coating of fiber prepreg, which had a fiber basis weight of 560,000 denier, was then applied. This was then covered with a fiber prepreg spiral wrap of 20,000 denier in fiber basis weight to a depth of about two mm. After the tensioning and hardening cycle was completed, the sample was tested. The sample was found to be very ductile with no visible damage during deflection. In the prior art polyethylene protective layers have been disclosed as coatings for conventional composites, however, the low adhesion of polyethylene to the composites and to cements and the low modulus of the coatings were limitations. This invention substantially reduces these limitations by allowing the inclusion of the polyethylene in the compartments or embedded directly in the ductile composite.

More complex constructions are possible. A composite was made with the Tyvek™ spiral tape wrap and with multiple fibers and multiple layers. The paste of Example I was used to saturate a 3670 Tex yarn of PPG 2016 pultrusion grade fiberglass, abraded Tyvek™ tape, 70,000 denier Winzen fiber yarn and 10,000 denier Winzen fiber exception that PPG 2001 fibers were replaced with PPG 2016 grade fibers. The fiberglass tow was formed into a larger tow having 47,600 Tex in fiber basis weight, then spiral wrapped with the 10,000 denier tow to a thickness of about one mm. It was then wrapped with the saturated Tyvek™ tape, followed by a cover of 420,000 denier polypropylene saturated tow. The rod was then finished with a 1.5 mm thick covering of spiral wrapped 10,000 denier polypropylene tow, strained to about 2.5 percent and thereafter treated as in Example I. The diameter of the finished rod was about 2.2 cm. This construction provides improved protection to the fiberglass compartment from both mechanical deformations and infiltration of hydroxide ions. In flexural testing this construction had very high rigidity combined with the ductility and the load carrying ability comparable to a number four steel rerod. The strain recovery was almost complete after being deflected to full extent as given in Example I.

The surprising utility of the composites of this invention to provide protective compartments indicated that the nature of the matrix in the composite may be different than a sample of the same lot of matrix material that was not used in the composite. It is known that the weight percent of water absorption of dry cementitious material is an indication of the volume fraction of some types of voids, pore structures or micro-cracks. Therefore samples of the composite and some of the same batch of matrix material that was not used in the composite were selected to have about the same dimensions. The samples were dried to constant weight at about 23 degrees centigrade and about 40 percent relative humidity. The samples were maintained in the dry state for two months to confirm equilibration. The samples were then submerged in the same vessel of distilled water and weighed periodically. The kinetics of water absorption for the samples were not precisely determined, however most of the water was absorbed during the first week for all of the samples. After three months, the weight fraction of water absorbed by the fiber free matrix was about 7.8 percent. The weight percent gain of the matrix material in the composite, after correcting for the fiber volume fraction, which was assumed to not absorb water, was about 4.5 percent. Although the invention does not depend on these results, the results support the findings of the invention. In this case, defects, presumably resulting from the shrinkage of the hydraulic matrix material, are reduced by self-compression. In the other cases self-compression controlled the defects resulting from externally induced deformation, impact, swelling and the like.

In summary, the composites of the invention are seen to provide mechanical properties far exceeding those of the brittle matrix composites of the prior art and they have improved properties over some of the conventional resin matrix composites. The invention can combine the desirable attributes of mat reinforced cements, pressure hardened cements and high performance aligned fiber resin matrix composites. The invention has been demonstrated with low cost, relatively non-toxic water based processing methods and simple equipment. The ability of the composites to afford protection to materials that are embedded in the composite is surprising. The compartments can protect materials such as glass fibers in an alkaline environment and steel in a corrosive environment to a heretofore unprecedented degree. This is believed possible because of the unique micro-mechanical response of the composites to stress.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

The invention claimed is:

1. A fiber reinforced composite material having a predetermined elongated configuration which exhibits self-compression, comprising:

(a) a three dimensional array of substantially aligned, continuous, extensible, elastic polymeric fibers that are disposed to longitudinally and laterally support the composite material;

(b) a brittle matrix material of a predetermined high modulus and including cementitious material, associated with the array of fibers wherein at least some of the fibers are temporarily tensioned and subsequently maintained in an extended, aligned elastic state by the high modulus brittle matrix material itself; and (c) whereby the composite material exhibits three-dimensional self-compression as a result of stored elastic energy acting on the brittle matrix material to yield an increased composite material load carrying ability in flexure, and whereby the composite material does not require an attached rigid body to maintain said fibers in the extended, aligned elastic state.

2. A composite material comprising a three dimensional array of substantially aligned, continuous, elastic fibers and brittle matrix material, wherein at least some of the fibers are maintained in an extended, aligned elastic state at least in part by support of the brittle matrix material, whereby the composite material exhibits self-compression as a result of stored elastic energy acting on the brittle matrix material.

3. The composite material of claim 2, wherein the fibers are polymeric fibers.

4. The composite material of claim 3, wherein the fibers are selected from the group of fibers consisting of polyolefins and polyamides.

5. The composite material of claim 2, having at least 10 volume percent fibers.

6. The composite material of claim 2, wherein the brittle matrix material is cementitious.

7. The composite material of claim 6, wherein the cementitious material is a hydraulic cement selected from the group of hydraulic cements consisting of Portland cement, alumina cements, natural cements, pozzolans, slag cements and aqueous mixtures thereof.

8. The composite material of claim 2, wherein the fibers are disposed substantially both longitudinally and laterally.

9. The composite material of claim 8, wherein a portion of the fibers are disposed in substantially a lengthwise direction and a portion is disposed spirally.

10. The composite material of claim 8, wherein the fibers are twisted.

11. The composite material of claim 8, wherein the fibers are braided.

12. The composite material of claim 2, wherein the brittle matrix material has a neat matrix maximum strain less than one percent and wherein the fibers have a maximum strain greater than two percent.

13. The composite material of claim 2, wherein the composite material further includes at least one compartment, bounded by lateral dimensions of the composite material.

14. The composite material of claim 2, wherein the composite material is associated with at least one other material by a method selected from the group of methods consisting of embedding, treating, covering and attaching.

15. The composite material of claim 2, wherein the extended, aligned, elastic state of the fibers is produced by tensioning the fibers in one dimension and subsequently releasing tension.

16. The composite material of claim 2, wherein the brittle matrix material has a high modulus of at least 10 GPa.

* * * * *